(12) United States Patent
Zhang et al.

(10) Patent No.: US 8,683,579 B2
(45) Date of Patent: Mar. 25, 2014

(54) SOFTWARE ACTIVATION USING DIGITAL LICENSES

(75) Inventors: Ning Zhang, Bothell, WA (US); Aditya Dhar, Issaquah, WA (US); David Maralack, Snoqualmie, WA (US); Ajay Bhave, Bellevue, WA (US); Jihad Tafas, Sammamish, WA (US); Matt Graves, Issaquah, WA (US); Eric Timmreck, Seattle, WA (US); Mike Weidenbener, Seattle, WA (US); Chris McMillan, Woodinville, WA (US); Shane Patton, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 124 days.

(21) Appl. No.: 12/968,021

(22) Filed: Dec. 14, 2010

(65) Prior Publication Data

US 2012/0151574 A1 Jun. 14, 2012

(51) Int. Cl.
*G06F 17/00* (2006.01)
(52) U.S. Cl.
USPC .......................................................... 726/19
(58) Field of Classification Search
USPC .......................................................... 726/19
See application file for complete search history.

(56) References Cited

U.S. PATENT DOCUMENTS

| 5,745,879 A | 4/1998 | Wyman |
| 6,029,145 A | 2/2000 | Barritz et al. |
| 6,223,291 B1 * | 4/2001 | Puhl et al. ........................ 726/28 |
| 6,898,286 B2 | 5/2005 | Murray |
| 7,149,722 B1 * | 12/2006 | Abburi ............................. 705/59 |
| 7,444,506 B1 | 10/2008 | Datta et al. |
| 2002/0059570 A1 | 5/2002 | Yoo |
| 2002/0174356 A1 | 11/2002 | Padole et al. |
| 2003/0149670 A1 | 8/2003 | Cronce |
| 2003/0156719 A1 * | 8/2003 | Cronce ........................ 380/256 |
| 2004/0044629 A1 | 3/2004 | Rhodes et al. |

(Continued)

FOREIGN PATENT DOCUMENTS

| WO | 2010092655 | 8/2010 |
| WO | 2010092655 A1 | 8/2010 |

OTHER PUBLICATIONS

"International Search Report", Mailed Date: Apr. 10, 2012, Application No. PCT/US2011/059693, Filed Date: Nov. 8, 2011, pp. 9.

(Continued)

*Primary Examiner* — Kambiz Zand
*Assistant Examiner* — Abiy Getachew
(74) *Attorney, Agent, or Firm* — Andrew Sanders; Micky Minhas (57) ABSTRACT

Systems and methods are provided for activation of software that uses digital licenses. In some embodiments, a software vendor may securely deliver at least one digital proof-of-purchase to an OEM (e.g., to avoid piracy of software licenses). The OEM may install an associated software copy on a computer system, and store the at least one digital proof-of-purchase on it. The OEM may communicate the proof(s)-of-purchase stored on the computer system and its system identifier to the software vendor. A user of the computer system may attempt to activate the OEM pre-installed software by sending an activation request to a software vendor, who may verify whether or not the digital proof-of-purchase and system identifier in the activation request match those previously reported by the OEM, and may either grant or deny the activation request.

20 Claims, 7 Drawing Sheets

(56) References Cited

U.S. PATENT DOCUMENTS

| | | | |
|---|---|---|---|
| 2004/0093599 A1 | 5/2004 | Reynaud | |
| 2004/0194083 A1 | 9/2004 | Hindle et al. | |
| 2004/0268120 A1 | 12/2004 | Mirtal et al. | |
| 2005/0146966 A1* | 7/2005 | Kawamura | 365/222 |
| 2005/0188228 A1 | 8/2005 | DeMello et al. | |
| 2005/0195978 A1 | 9/2005 | Babic et al. | |
| 2005/0289072 A1 | 12/2005 | Sabharwal | |
| 2006/0089912 A1* | 4/2006 | Spagna et al. | 705/51 |
| 2006/0195689 A1 | 8/2006 | Blecken et al. | |
| 2007/0050850 A1 | 3/2007 | Katoh et al. | |
| 2008/0040701 A1* | 2/2008 | Stern | 717/100 |
| 2008/0114695 A1* | 5/2008 | Gutierrez | 705/59 |
| 2008/0189549 A1 | 8/2008 | Hughes | |
| 2008/0319779 A1 | 12/2008 | Hughes et al. | |
| 2009/0089881 A1 | 4/2009 | Indenbom | |
| 2009/0094372 A1 | 4/2009 | Nyang et al. | |
| 2009/0216861 A1* | 8/2009 | Shiely et al. | 709/219 |
| 2010/0250400 A1 | 9/2010 | Fernandez Gutierrez | |
| 2011/0055925 A1 | 3/2011 | Jakobsson | |
| 2011/0098030 A1* | 4/2011 | Luoma | 455/419 |

OTHER PUBLICATIONS

Seleborg, S., "Axantum Strong Software Licensing," Version 0.3, 2004, 6 pages, www.axantum.com/axcrypt/etc/Axantum-Strong-Licensing.pdf.

Windows 7 Ultimate Cracked and Activated Permanently with OEM SLP Master Product Key (with SLIC 2.1), Jul. 29, 2009, 12 pages, http://www.mydigitallife.info/2009/07/29/windows-7-ultimate-cracked-and-activated-permanently-with-oem-slp-master-product-key-with-slic-2-1/.

Windows Activation Technologies in Windows 7, Jun. 2009, 11 pages, http://technet.microsoft.com/en-us/library/dd979803.aspx#EDDAE.

"International Search Report", Mailed Date: May 30, 2012, Application No. PCT/US2011/063462, Filed Date: Dec. 6, 2011, pp. 9.

"Inside Windows Product Activation", Retrieved at <<http://www.licenturion.com/xp/fully-licensed-wpa.txt>>, Jul. 2001, pp. 10.

Walton, Jeffrey., "Product Activation Based on RSA Signatures", Retrieved at <<http://www.codeproject.com/KB/security/ProductActivation.aspx>>, Jun. 6, 2007, pp. 17.

Non-Final Office Action mailed Sep. 26, 2012 in U.S. Appl. No. 12/950,777, 16 pages.

Non-Final Office Action mailed Feb. 19, 2013 in U.S. Appl. No. 12/950,627, 19 pages.

Final Office Action mailed Jun. 19, 2013 in U.S. Appl. No. 12/950,777, 16 pages.

Final Office Action mailed Sep. 10, 2013 in U.S. Appl. No. 12/950,627, 21 pages.

Non-Final Office Action mailed Sep. 10, 2013 in U.S. Appl. No. 12/950,777, 18 pages.

Chinese Office Action mailed Nov. 5, 2013 in CN Patent App. No. 201110370740.0, 11 pages including partial translation and Concise Statement of Relevance.

Chinese Office Action mailed Dec. 2, 2013 in CN Patent App. No. 201110367803.7, 9 pages including partial translation and Concise Statement of Relevance.

* cited by examiner

Digital Authorization Information Set (DAIS)
~ 100

| Definition: | Unique, Individual Proof-of-Purchase | OEM Identifier | Machine Identifier | Examples: Date & Time Stamp Alphanumeric SKU identifier OEM model number Service Tag Information from Software Distributors |
|---|---|---|---|---|
| Source: | Software Vendor | Software Vendor OEM | System Hardware | Software Vendor OEM |

SOFTWARE ACTIVATION USING DIGITAL LICENSES

BACKGROUND

Software products such as operating systems and application programs often contain materials that are protected under copyright law, which grants the author of a piece of original work (e.g., software code) exclusive rights over the usage and distribution of the work. To obtain a copy of a software product from a vendor who owns rights to that software product, a user and the vendor typically enter into a license agreement, which governs how the user may use and/or distribute the software product. For example, the license agreement may restrict the number of times the user can install the software and/or the number of computers on which the software may be installed.

It is damaging to vendors selling software product licenses, if users obtain copies of software products without paying for them. To prevent use of such unauthorized copies, software vendors often require that an "activation" process be completed when an attempt is made to install a copy of a software product. This process typically involves determining whether the copy is authorized for installation (e.g., whether the copy was legitimately purchased by the user) and/or whether the installation is in compliance with one or more applicable license agreements (e.g., whether the user has exceeded a maximum number of permitted installations).

Some conventional software activation techniques make use of a so-called "proof-of-purchase," which is a piece of information made available to a user when the user legitimately purchases or otherwise legitimately obtains a copy of a software product, and which serves as "proof" of legitimacy of the purchase. When such proof is accepted or validated, the user is given permission to complete the installation, and appropriate features in the software product are enabled depending on the license(s) granted to the user for that particular installation.

Often, it is the case that a computer system purchased from a retailer has software pre-installed by an original equipment manufacturer (OEM) or an original design manufacturer (ODM). Hereinafter, the terms OEM and ODM are used interchangeably. In this setting, one of the conventional approaches to software activation is based on the so-called "bypass" mechanism, wherein the OEM buys a generic license from a software vendor and stores a static token associated to the generic license on the computer system's hardware (e.g., the motherboard BIOS). Next, an individual proof-of-purchase paper sticker—called a certificate of authenticity (COA)—is affixed to the computer. The COA allows users to visually verify whether or not the software they purchased is genuine. Users may input the COA to activate the software pre-installed by the OEM without interfacing with, and thereby bypassing, the software vendor.

SUMMARY

The inventors have recognized a number of deficiencies in conventional software activation techniques based on the bypass mechanism including their susceptibility to software license piracy. One example occurs when certificates of authenticity are forged. Another example occurs when a computer manufacturer illegally installs one software copy on multiple new computers and affixes previously-sold COAs to them.

Another shortcoming of the conventional bypass mechanism is the cost of its implementation. Affixing paper COAs to each computer is expensive and labor-intensive, as it requires inventorying the COAs, secure physical storage, and secure transportation. For example, armored trucks are sometimes used to deliver paper COAs. Returning purchased software and/or computer systems is expensive for similar reasons.

The inventors have also recognized that the conventional bypass mechanism makes it difficult to collect so-called "correlation data," which herein refers to any information that may be useful to a software vendor or an OEM. Examples of correlation data include business-related data, often termed "business intelligence," which may include information such as the number of computers pre-installed with a software product, their hardware configurations, and/or the locations of these computer systems once they are shipped. Other examples of correlation data include how often computer-systems pre-installed with the software fail and the nature of these failures.

Some embodiments of the invention address these and/or other shortcomings by using digital proofs-of-purchase (i.e., licenses) instead of conventional, paper COAs, and electronically delivering them from a software vendor to an OEM over a secure network. This may not only reduce the cost of the software activation process by eliminating costs associated with storing and transporting paper COAs, but may also make software piracy and license forgery more difficult.

In some embodiments, after a software product is installed on a computer, the corresponding digital proof-of-purchase may be associated to a system identifier that depends on the system's hardware configuration. This differs from the conventional bypass mechanism, wherein each COA was associated with the same static token derived from a generic license. Before shipping the system to a user, the OEM may store the digital proof-of-purchase and the system identifier on the system hardware and may report both to the software vendor. This may make illegally installing a copy of a software product on multiple computers—an example of software piracy—more difficult.

In some embodiments, the user may send an activation request to the software vendor that includes the proof-of-purchase and system identifier stored on the system. The software vendor may permit the user to complete the installation. This may make software piracy more difficult because information associating a specific proof-of-purchase to a specific computer system may be used by the software vendor to decide whether or not to give the user permission to complete the installation.

In some embodiments, an OEM and a software vendor may share correlation data with one another. For instance, the OEM may report to the software vendor the number of systems pre-installed with a specific software product having a specific hardware configuration that were sold in the last year. The inventors have recognized that gathering and sharing such information may be easier if specific copies of software products are associated to specific computer systems.

The foregoing is a non-limiting summary of the invention, which is defined by the attached claims.

BRIEF DESCRIPTION OF DRAWINGS

The accompanying drawings are not necessarily drawn to scale. In the drawings, each identical or nearly identical component that is illustrated in various figures is represented by a like numeral. For purposes of clarity, not every component may be labeled in every drawing. In the drawings.

DETAILED DESCRIPTION

In accordance with some embodiments of the present disclosure, information identifying software copies (e.g., proofs-of-purchase), computer systems (e.g., system identifiers), and OEMs (e.g., OEM identifiers) may be created by and/or exchanged among various parties involved in the software activation process. Herein, the term "digital authorization information set" (DAIS) is used to refer at least to some of this information. For example, a digital authorization information set may comprise a proof-of-purchase of a software product copy and a system identifier. A digital authorization information set may further comprise any information that an OEM may wish to report to a software vendor such as an OEM identifier.

Figure 1:
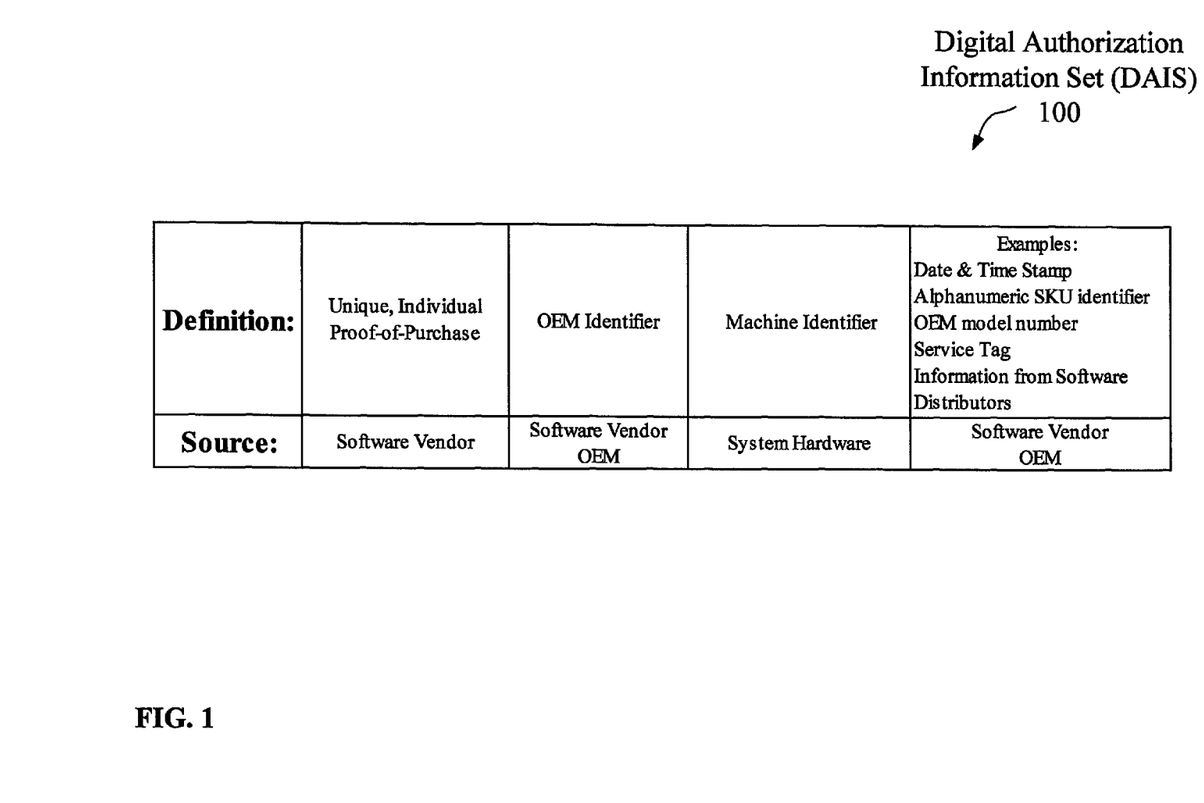
FIG. 1 shows a table delineating elements of a digital authorization information set, in accordance with some embodiments of the present disclosure.

FIG. 1 depicts an example of a digital authorization information set 100 comprising a digital proof-of-purchase (PoP) 101, an OEM identifier 102, a system identifier 103, and additional information 104.

The proof-of-purchase 101 comprises information made available to a customer (e.g., OEM, third-party, user) when the customer legitimately purchases or otherwise legitimately obtains a copy of a software product. The PoP serves as "proof" of legitimacy of the customer's software copy. A unique proof-of-purchase may be associated to each copy of the software product.

In some embodiments, the proof-of-purchase 101 may be generated by a software vendor and may be of any suitable type. For example, it may be a number or an alphanumeric string.

In some embodiments, the proof-of-purchase may be a product key of the type described in U.S. patent application Ser. No. 12/950,777, filed Nov. 19, 2010, and entitled "Secure Software Product Identifier for Product Validation and Activation," which is incorporated herein by reference in its entirety. A brief description of this type of product key follows.

In some embodiments, a product key may include two components: an identification component for identifying a specific copy of a software product (or a group of copies in case of a corporate license), and a security component that can be used to verify that the product key was generated by some proper authority (e.g., the software vendor) and/or has not be tampered with during distribution. For example, the identification component may include a serial number, and the security component may include an electronic signature over the serial number that is generated using a secret key of the software vendor.

An illustrative product key in a so-called 5×5 format where 24 of the 25 characters are drawn from an alphabet of 24 characters "BCDFGHJKMPQRTVWXY2346789," and a special character "N" is inserted into the 9$^{th}$ position is shown as EXAMPLE 1 below:

Example 1

BCDFG-HJK(N)M-PQRTV-WXY23-46789

This format may be compatible with existing product key implementations that also use the 5×5 format, and the position of the special character "N" may be used by an installation program for auxiliary purposes.

In some embodiments, the product key of EXAMPLE 1, with the special character "N" removed, may be decoded into a string of 114 bits. The first 50 bits in the bit string may correspond to an identification component of the product key, with the first 20 bits representing a group ID and the remaining 30 bits representing a serial number. The next 63 bits may correspond to a security component of the product key, where 40, 13 and 10 bits are allocated respectively to a first security value, a second security value, and a checksum. The final bit may indicate whether the copy of the software product associated with the product key is distributed via a third party.

Referring to FIG. 1, the OEM identifier 102 includes information that may uniquely identify the OEM, and may be of any suitable type. For instance it may be an alphanumeric identifier. The OEM identifier may be obtained in any number of ways. For instance, it may be generated by the OEM or assigned to the OEM by another party. The OEM may provide the OEM identifier to the software vendor or third parties that the OEM may interface with during the purchase of software licenses.

The system identifier 103 may be an identifier of a computer system. In some instances the system identifier 103 may be unique, and in other instances it may be non-unique. It may be generated by the OEM and may be of any suitable type, and may be a number or alphanumeric string. An example system identifier, in this case an alphanumeric string, is shown as EXAMPLE 2 below:

Example 2

MAAAAAAAAgABAAIAAAACAAAA-
AgABAAEAeqiexgAYen+
Y2lp4QrLqGtRfglFqHv5h

The system identifier may depend on the aspects of the computer system. For instance it may depend on the system's hardware such as the motherboard, processor, and Random-Access-Memory (RAM). In other embodiments, since hardware components of a computer system may need to be replaced, it may be useful to employ system identifiers that do not depend on the replaced hardware. Accordingly, the system identifier may depend only on a subset of the computer system's hardware. For example, if a system identifier does not depend on the hard drive, then a computer will have the same system identifier even if the computer's hard drive were replaced. However, not all embodiments of the invention are limited to such an implementation. For example, the system identifier may depend on the software installed on the computer system in addition to its hardware configuration.

A digital authorization information set may comprise additional information 104 that is useful in the software activation process. Additional information may be of any suitable type and may, for example, include a date and time stamp of a software and/or a system purchase, an alphanumeric stock-keeping unit (SKU) identifier, an OEM model number, a service tag, and software-related information from any of numerous software distributors including, for instance, software vendors, OEMs, distributors, and retailers.

Figure 2:
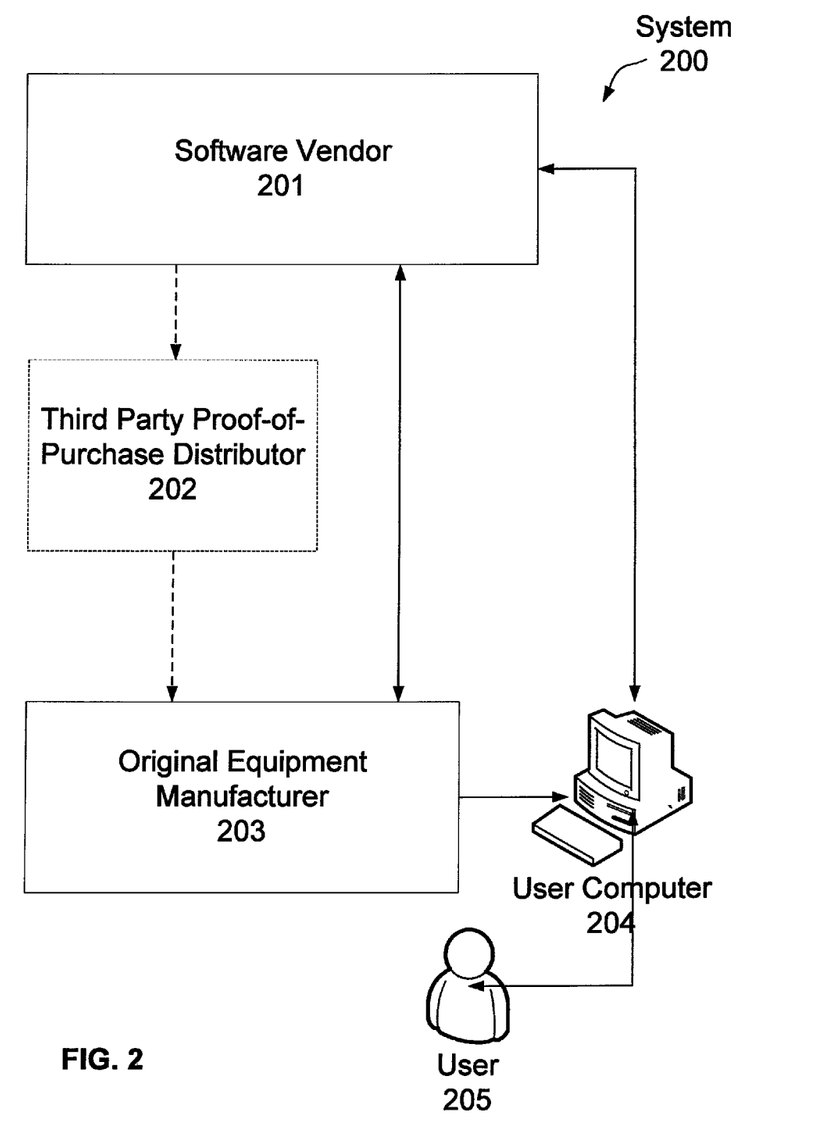
FIG. 2 shows an illustrative system for software activation using digital licenses in accordance with some embodiments of the present disclosure.

FIG. 2 depicts an illustrative system 200 for software activation using digital licenses. The example system 200 may comprise a software vendor component 201, an OEM component 203, a user computer 204, and a third party proof-of-purchase distributor component 202, hereinafter referred to as the software vendor, OEM, user computer, and third party proof-of-purchase distributor, respectively. The optional inclusion of the third party PoP distributor 203 is indicated by dashed lines in FIG. 2. The example system 200 may be implemented in any number of ways. For instance, though not depicted in FIG. 2, the example system 200 may comprise a plurality of software vendors, a plurality of OEMs, and/or a plurality of users. Furthermore, each of the components 201, 202, 203, and 204 may comprise a computer or a plurality of computers.

In the example system 200, communications among any subset of components (e.g., between the software vendor 201 and the OEM 203) may be realized via networks which may comprise, for example, the Internet, a LAN, a WAN and/or any other wired or wireless network, or combination thereof. Communications may also be realized via portable storage devices including USB keys, portable hard-drives, compact disks and/or any other suitable computer-readable storage media.

In some embodiments, the software vendor 201 may deliver at least one digital proof-of-purchase to the OEM 203. The delivery may be accomplished in any number of ways, for instance, by using a secure channel. Communications over a secure channel may comprise using the Hypertext Transfer Protocol Secure (HTTPS) or any other cryptographic device or protocol.

In other embodiments, the software vendor 201 may deliver at least one digital proof-of-purchase to the OEM through a third-party proof-of-purchase distributor 202 in any of numerous ways. For instance, the OEM may first provide at least one digital proof-of-purchase to the third party proof-of-purchase distributor 202. The third party proof-of-purchase distributor 202 may then provide the at least one digital proof-of-purchase to the OEM 203.

In some embodiments, each proof-of-purchase provided to the OEM 203 authorizes the OEM 203 to install a copy of a software product on a computer. For each software product copy the OEM 203 installs on a computer system, the OEM 203 may store additional information, which may be useful in the software activation process, on the system hardware. For instance, the OEM 203 may generate a system identifier associated to the computer system and may store it on the system hardware. Another example comprises storing the proof-of-purchase on the system hardware. Still another example comprises storing correlation data on the system hardware. The OEM 203 may create a digital authorization information set 100 comprising the proof-of-purchase and the system identifier, and may store this digital authorization information set 100 in an electronic storage system.

The OEM 203 may alert the software vendor 201 that copies of a software product were installed (e.g., the software product to which the delivered proofs-of-purchase were associated). This may be accomplished in any of numerous ways. For instance, the OEM 203 may alert the software vendor 201 to which proofs-of-purchase were used, by sending the software vendor 201 a report comprising the stored proofs-of-purchase coupled with system identifiers of the systems they were stored on. Although not depicted in FIG. 2, the software vendor 201 may store this information in an electronic storage system. The OEM 203 may ship at least one of the systems pre-installed with the software to a user 205. Once the user 205 receives said system, the system is referred to as the user's computer 204.

In some embodiments, the user's computer 204 may attempt to automatically activate software installed on it. This may be accomplished using any suitable means, for instance, by establishing a connection to the software vendor 201 and sending an activation request. The activation request may comprise a proof-of-purchase 101 and a system identifier 103 stored on the user's computer 204.

In other embodiments, the user 205 may attempt to activate the software installed on the user's computer 204 by establishing a telephone connection with the software vendor 201 and communicating information to activate and validate the pre-installed software. The information may comprise an identification number that may be provided by the user's computer 204, and which may depend on the proof-of-purchase and system identifier stored on the user's computer 204. Any of numerous other techniques for activating the software installed on the user's computer 204 may instead be employed. For example, the system identifier may not be employed in the activation process in order to allow activation of software on computers that may not have valid system identifiers associated to them.

The software vendor 201 may receive an activation request from a user's computer 204 or a user 205. The activation request may comprise a proof-of-purchase 101 and a system identifier 103. The software vendor 201 may use any of numerous techniques to decide whether or not to grant or deny the activation request. For instance, the software vendor may compare the proof-of-purchase and the system identifier to see if they match, to within a tolerance, a proof-of-purchase and a system identifier reported by the OEM 203.

Figure 3:
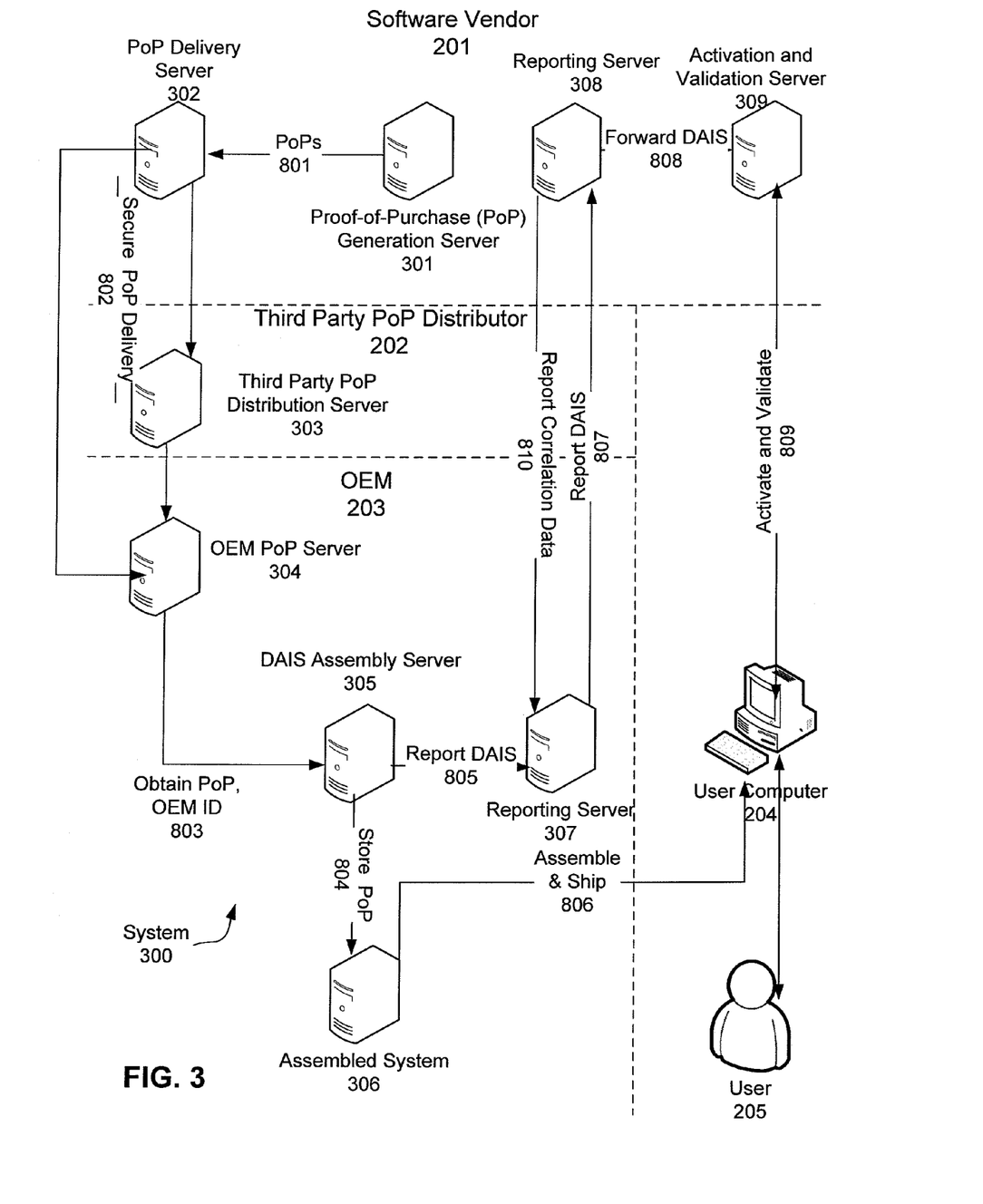
FIG. 3 shows another illustrative system and a process for software activation using digital licenses in accordance with some embodiments of the present disclosure.

FIG. 3 depicts illustrative system components and techniques for software activation using digital licenses. The example system components further illustrate the example system 200 depicted in FIG. 2, and comprise software vendor's 201 servers including a PoP generation server 301, a PoP delivery server 302, a reporting server 308, and an activation and validation server (AVS) 309. The system components may further comprise a third party PoP distribution server 303 belonging to a third party PoP distributor 202. The system components further comprise OEM 203 servers including an OEM PoP server 304, a DAIS assembly server 305, a reporting server 307, and a system 306 to be assembled at the OEM factory and sent to the user 205.

Communications among any subset of computers (e.g., among servers 301, 302, 308, and 309) may be realized via networks which may comprise, for example, the Internet, a LAN, a WAN and/or any other wired or wireless network, or combination thereof. Communications may also be realized via portable storage devices including USB keys, portable hard-drives, compact disks and/or any other suitable computer-readable storage media. The software vendor servers 301, 302, 308, and 309 need not be separate computers. As an example, servers 302, 308, and 309 may comprise programmed instructions which execute on the PoP generation server 301. Similarly, OEM servers 304, 305, 307 need not be separate computers. Though not shown in FIG. 3, the example system components may comprise a plurality of software vendors, a plurality of OEMs, and/or a plurality of users.

The example system components depicted in FIG. 3 may perform a process to activate software pre-installed on a computer by an OEM. The process illustrates how digital proofs-of-purchase may be associated to individualized hardware systems, and how the resultant pairings of proofs-of-purchase and system identifiers may be created, reported by the OEM 203 to the software vendor 201, and subsequently used in the activation process by the user 205.

In act 801, the PoP generation server 301 generates a plurality of digital proofs-of-purchase and transmits them to the PoP delivery server 302. In act 802, a plurality of digital PoPs may be delivered to the OEM PoP server 304 in any of numerous ways. For example, the digital PoPs may be delivered from the PoP delivery server 302 to the OEM PoP server 304 directly. Another possibility is that PoPs may be delivered from the software vendor to the OEM through a third-party PoP distributor. For instance, the PoPs may be first delivered from the PoP delivery server 302 to the third party PoP distribution server 303, and then delivered from the third party PoP distribution server 303 to the OEM PoP server 304. Digital PoPs may be delivered securely using any suitable means, for instance by using the Hypertext Transfer Protocol Secure (HTTPS) and/or any other cryptographic procedure.

In some embodiments, the OEM may purchase PoPs directly from the software vendor. This transaction may be accomplished in any of numerous ways. For instance, the OEM may connect to a website hosted on the PoP delivery server 302, place an order specifying the number of proofs-of-purchase to buy, and download the purchased PoPs directly to the OEM PoP server 304. Many alternative implementations are possible. For instance, connections not relying on the Hypertext Transfer Protocol (HTTP) may be used.

In some embodiments, the OEM may purchase PoPs from the third party PoP distributor using any suitable means. For instance, the OEM may connect to a website hosted on the third-party PoP delivery server 303, place an order specifying the number of proofs-of-purchase, and download the purchased PoPs to the OEM PoP server 304. Many alternative implementations, not relying on an HTTP connection, are possible.

After the OEM 203 receives proof(s)-of-purchase associated to a software product from the software vendor 201, a system 306 may be assembled, pre-installed with a copy of the software product at the OEM 203, and shipped to the user 205. The OEM may generate and/or collect information identifying aspects of the assembled system 306. For instance, in act 803, the DAIS assembly server 305 may obtain a PoP 101 and an OEM identifier 102 from the OEM PoP Server 304, generate a system identifier 103, and assemble a digital authorization information set comprising said PoP, OEM and system identifiers, and any additional information 104. The OEM 203 may communicate some of this information to the software vendor 201. For example, the OEM 203 may report the digital authorization information set to the software vendor 201.

In act 804, the DAIS assembly server 305 stores the proof-of-purchase on the system hardware (e.g., on a hard disk or motherboard BIOS). This assignment of a proof-of-purchase to a computer system may be an indication of the software purchase by the user 205. Storing proofs-of-purchase on the system hardware eliminates the need for the user 205 to input these PoPs during the software activation and validation process 809. The process of associating a software proof-of-purchase to a system identifier is further disclosed and illustrated by reference to FIG. 4 below.

After the digital authorization information set is assembled in act 804, it is sent to the OEM 203 reporting server 307, in act 805. In act 807, the reporting server 307 reports the digital authorization information set to the software vendor's reporting server 308. The reporting data may comprise the proof-of-purchase and the system identifier. The reporting data may further comprise the system hardware component profile, the OEM identifier, and any additional data that the OEM 203 wishes to communicate to the software vendor 201. In act 806, the OEM 203 may ship the assembled system to the user 205. Alternatively, the OEM 203 may ship the assembled system any suitable entity such as, for example, a retail store or a distributor.

After receiving the digital authorization information set, the software vendor's reporting server 308 forwards the digital authorization information set to the AVS 309. The software vendor may store the information sent by the OEM using electronic file storage (not shown). This information may be organized using any suitable means. For instance, the electronic file storage may have an entry for every proof-of-purchase that has been stored on some system by the OEM, along with the associated system identifiers. Additionally and/or alternatively, entire system hardware profiles may be stored along with every proof-of-purchase.

In act 809, the user's computer 204 and/or the user 205 may contact the AVS 309 to activate the software pre-installed on the user's computer 204 by the OEM 203. The activation and validation process 809 may also be performed prior to the shipping of the assembled system 306 to the user 205. Details of the activation and validation process are further disclosed and illustrated by reference to FIG. 5 and FIG. 6 below.

The software vendor may share correlation data with the OEM 203 in any of numerous ways. For instance, the software vendor's reporting server 308 reports correlation data to the OEM reporting server 307 in act 810. Correlation data may be derived from information accumulated across multiple OEMs, multiple systems, and other sources. Illustrative examples include the number of software activations between two dates (e.g., between November 2008 and December 2009), the number of system failures as a function of their hardware configuration or as a function of where they were sent. Other correlation data may additionally, or alternatively, be defined and collected, as embodiments of the invention are not limited in this respect. The process, performed by the example system components depicted in FIG. 3, then completes.

Figure 4:
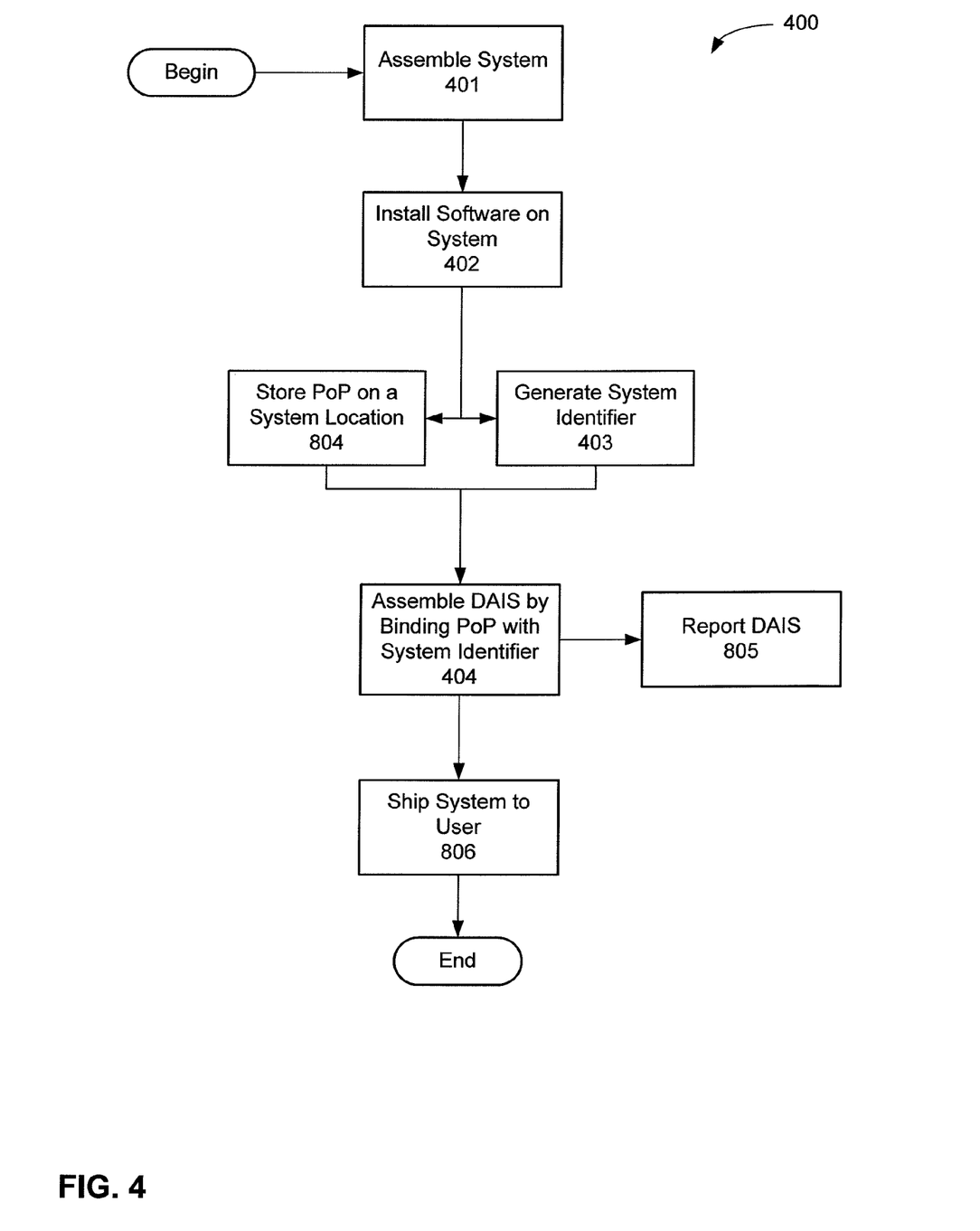
FIG. 4 shows an illustrative process for associating a software proof-of-purchase to a system identifier, in accordance with some embodiments of the present disclosure.

FIG. 4 depicts an illustrative process 400 for associating a software proof-of-purchase to a system identifier that may be performed by the OEM 203, in accordance with some embodiments of the present disclosure.

In this example, the process begins at act 401 when the OEM 203 assembles a system 306 to be shipped 806 to the user 205. Once the system 306 is assembled, the OEM 203 may establish a connection to the system 306 in any of numerous ways. For instance, the OEM 203 may connect to the system 306 remotely from the DAIS assembly server 305 or any other server. The OEM 203 may interface with the system 306 in other ways including direct, physical operation of the system 306 by a person.

In act 402, the OEM 203 installs a copy of the software product on the system 306, and stores an associated proof-of-purchase on any location of the system 306 in any of numerous ways, in act 804. For example, the proof-of-purchase may be saved by the DAIS assembly server 305. The system location may be any location accessible to an operating system running on the system 306. Examples of suitable system locations include the system BIOS, a secure location in the file system, the registry if a Microsoft Windows-family operating system(s) is installed on the system 306, text files, storage locations accessible via an implementation of the Unified Extensible Firmware Interface (UEFI), and a Trusted Platform Module (TPM). Other suitable locations include any computer-readable storage medium (e.g., USB key, magnetic disk, CD, DVD, etc.) accessible by the system 306. The installation of the software product and storing the associated proof-of-purchase on the system 306 may occur in any suitable order so that the proof-of-purchase may be stored before, concurrently with, or after the software product is installed.

In act 403, the DAIS assembly server 305 generates a system identifier corresponding to the assembled system 306. In act 404, a digital 100 is assembled comprising the stored digital proof-of-purchase 101 and the generated system identifier 103. The digital authorization information set may further comprise the system hardware profile, and any additional data that the OEM 203 may wish to communicate to the software vendor 201. This process establishes the binding between the installed software copy (represented by the proof-of-purchase) and the system hardware (represented by the system identifier and hardware profile). The system identifier may be obtained in any of other numerous ways. It may be generated by any suitable entity at any suitable location. It may, for example, be generated by any OEM 203 server at the same location as the assembled system, by the assembled computer system 306, or by any OEM 203 server at a different location. Many other possibilities will be apparent to those skilled in the art.

The OEM 203 may alert the software vendor 201 that copies of a software product were installed and provide any additional information of interest to the software vendor 201 in any of numerous ways. For instance, in act 805 the assembled digital authorization information set is reported to the OEM reporting server 307. After the system 306 is shipped to the user 205 in act 806, the process 400 completes.

Figure 5:
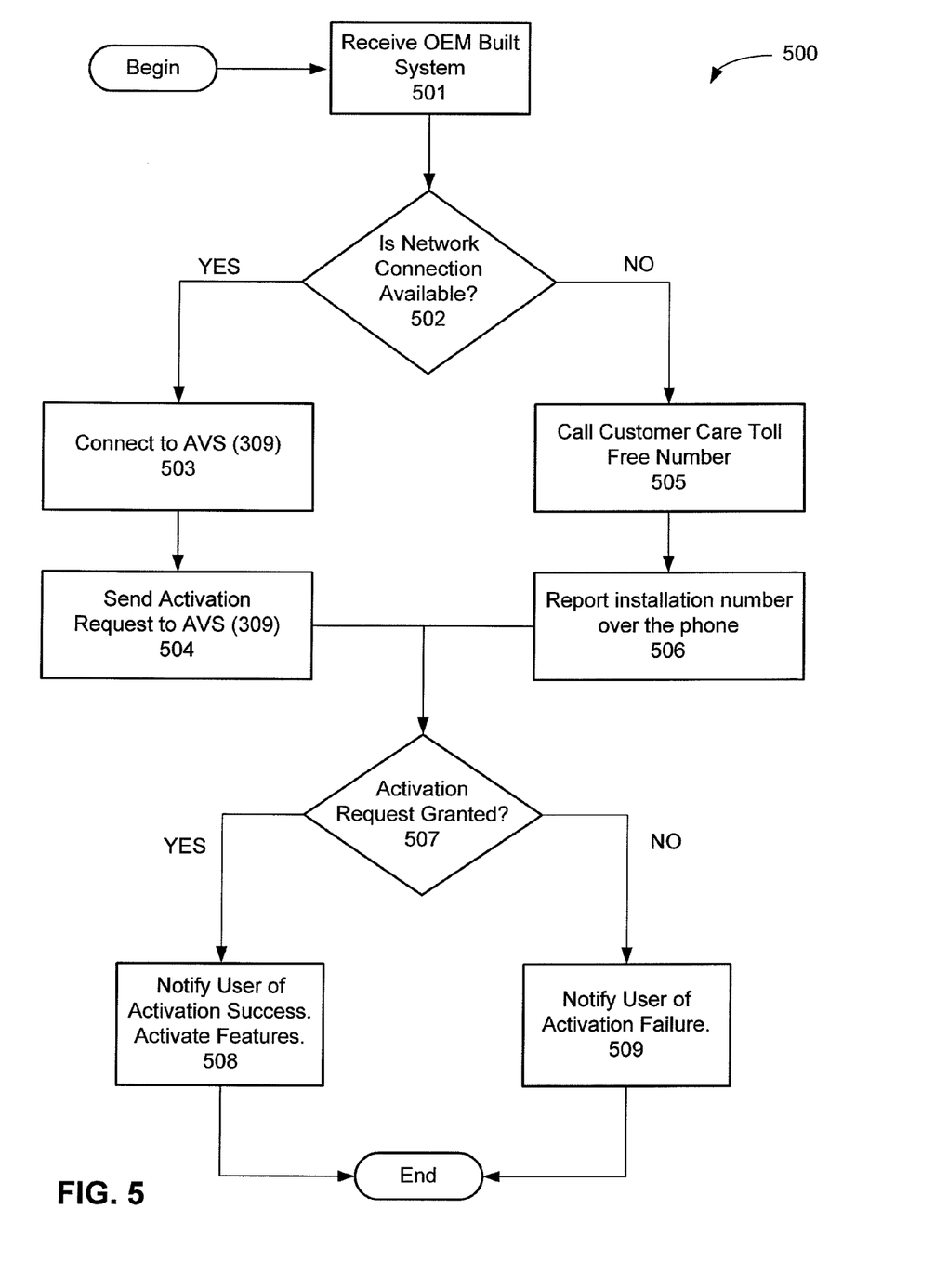
FIG. 5 shows an illustrative process that may be performed by a user and/or user's computer to activate and validate software pre-installed on the user's computer by an OEM, in accordance with some embodiments of the present disclosure.

Referring to FIG. 5, an illustrative process 500 is shown that may be performed by the user 205 and/or user's computer system 204 to activate and validate software on the user's computer system 204, in accordance with some embodiments of the present disclosure. In alternative embodiments, the activation and validation process 809 may be performed by other entities. In some embodiments, the OEM 203 may activate and validate the software installed on the assembled system 306 before shipping it to the user. In still other embodiments, the assembled system 306 may be shipped to a third party (e.g., retailer) that activates and validates the software prior to the user's acquiring the system 306. Many other alternatives are possible.

In the example shown in FIG. 5, the process 500 begins at act 501 with the user receiving an OEM-built computer, herein referred to as the user's computer system. The process 500 may proceed with or without user 205 intervention. Determining whether user intervention may be required can be accomplished in any of numerous ways. For instance, at act 502 it is determined whether a network connection to an activation and validation server (e.g., the AVS 309 shown in FIG. 3) is available.

If a network connection to the AVS is available, the process 500 may proceed without user intervention. The user's computer system (e.g., the computer 204 shown in FIG. 2 and in FIG. 3) establishes a connection with the AVS at act 503, and sends an activation request to the AVS, at act 504. The activation request may include a proof-of-purchase (e.g., a product key), the hardware component profile of the user's computer, and an associated system identifier. The activation request may include additional and/or alternative information. If the activation request is granted or denied, any of numerous actions may be performed. For example, notification of activation may be sent to the user, software installation may be allowed to complete, and software features may be enabled on the user's computer, in act 508. On the other hand, if the activation request is denied, a notification of installation failure may be sent to the requesting computer in act 509. Details of the decision process at the activation and validation server are further disclosed and illustrated by reference to FIG. 6.

If a network connection to the AVS is unavailable, the process 500 may proceed with some intervention from the user. The user 205 may help to communicate any necessary information to the software vendor 201. For instance, at act 505 the user 205 may establish a connection with the software vendor (e.g., by calling a customer care toll free number). However, not all embodiments of the invention are limited to such an implementation. For example, some embodiments may provide a capability whereby the user 205 establishes a connection with the software vendor and/or AVS 309 using a different computer or any other suitable means.

The user 205 may communicate an activation request to the software vendor 201 in any of numerous ways. For instance, in act 506 the user reports an identification number, which may be provided by a module of the software to be activated and/or may depend on the proof-of-purchase and the system identifier. In other embodiments, the user 205 may report the proof-of-purchase and the system identifier directly. The activation request may comprise additional and/or alternative information. If the activation request is granted or denied, any of numerous actions may be performed. For example, the user may be notified that the software installation is allowed to complete, and may be given instructions for how to enable software features in act 508. If the activation request is denied, the user may be notified of installation failure in act 509. The process 500 then completes.

Any of numerous other activation methods are possible and are not limited to the process illustrated in FIG. 5. In some instances, the system identifier may not be used as part of the activation and validation process. This may be useful if computer systems do not have a system identifier associated to them. Other activation methods may include online activation using an activation and validation server, activation within a corporate network using an enterprise-level volume activation management tool, full offline activation, or manual activation. Still other possibilities will be apparent to those skilled in the art.

Figure 6:
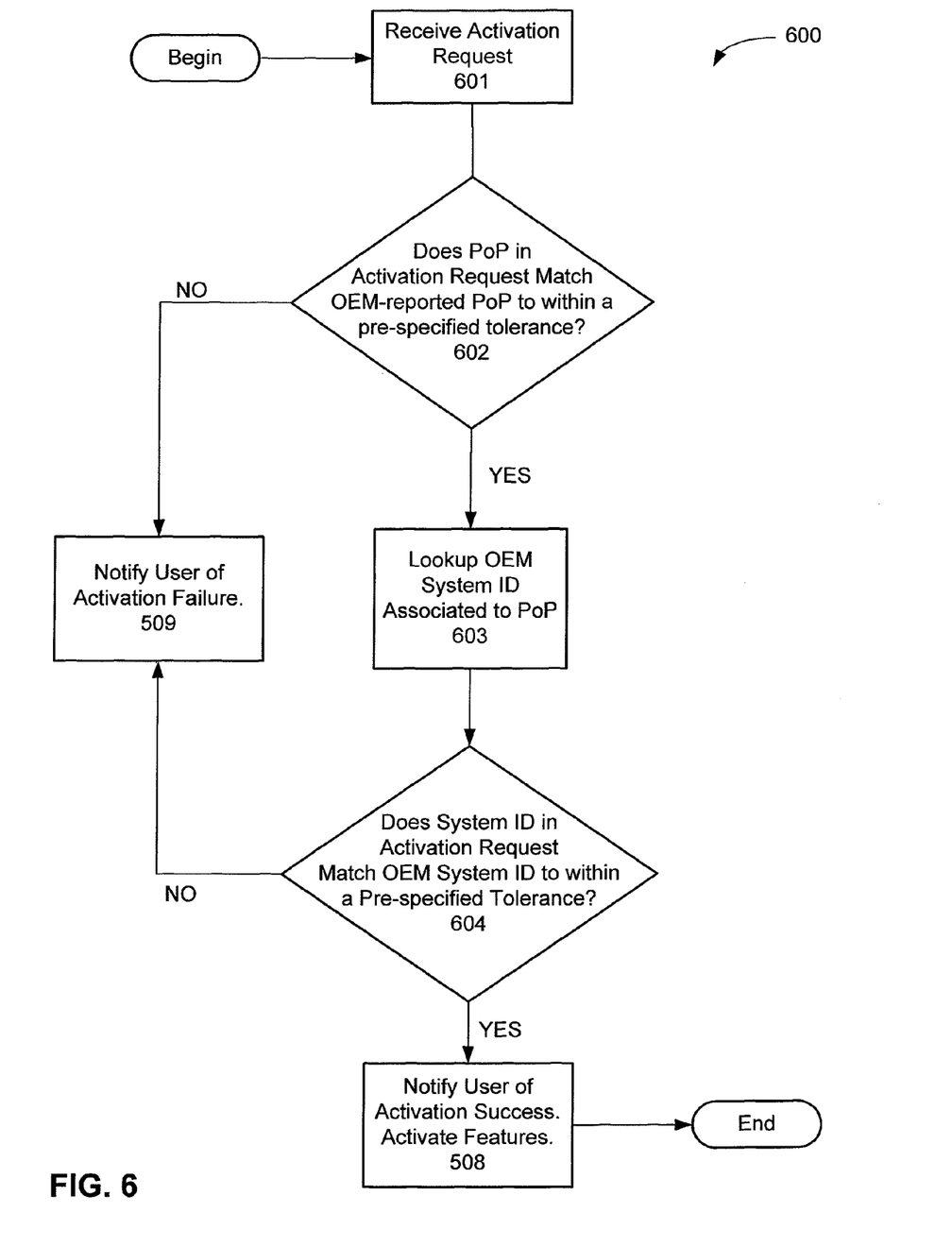
FIG. 6 shows an illustrative process that may be performed by an activation and validation server to activate and validate software on a user's system, in accordance with some embodiments of the present disclosure.

Referring to FIG. 6, an illustrative process 600 is shown that may be performed by an activation and validation server (e.g. the AVS 309 shown in FIG. 3) to activate and validate software on the user's system, in accordance with some embodiments of the present disclosure. The process 600 may be performed by at least one computer system, by at least one customer service representative, or by some combination thereof.

In this example, the process 600 begins at act 601 with the reception of an activation request from a user. The request may come from the user or the user's computer. In alternative embodiments, the request may come from any suitable OEM 203 server or any suitable third-party server. For instance, if the activation and validation process is performed before the assembled system 306 is sent to a user 205, the OEM 203 may generate and send the activation request to the activation and validation server 309.

The AVS may perform any of numerous actions to respond to the activation request. For instance, at act 602 the AVS may check whether the proof-of-purchase sent by the user's computer matches any proof-of-purchase reported by the OEM. If the proof-of-purchase in the activation request does not match the OEM-reported proof-of-purchase to within a first tolerance, a notification of activation denial and/or installation failure may be sent, in act 509. In this way, the activation and validation process has the flexibility to allow for variations between the proof-of-purchase reported by an OEM and the proof-of-purchase in the activation request. Such variations could arise for any numerous reasons such as the addition of extra bits to specify additional information, and/or communication errors. The first tolerance may, in some instances, be pre-specified, and in other instances the first tolerance may be dynamically determined.

Determining whether a first proof-of-purchase matches a second proof-of-purchase to within a first tolerance may comprise determining whether a distance between the two proofs-of-purchase is less than the first tolerance. The first tolerance may be a number indicating the maximal allowed distance between the first and second proofs-of-purchase, wherein distance between two proofs-of-purchase may be measured in any number of ways. For instance, if both proofs-of-purchase are binary strings, the distance could be the number of locations at which the bits are different.

If the proof-of-purchase in the activation request matches any OEM-reported proof-of-purchase to within a first tolerance, the AVS may perform additional acts in order to respond to the activation request. For example, the AVS may look up the system identifier associated to the OEM-reported proof-of-purchase, in act 603. At act, 604 the AVS checks whether or not the system identifier in the activation request matches the OEM-reported system identifier to within a second tolerance. In some instances, the second tolerance may be pre-specified, and in other instances the second tolerance may be dynamically determined.

Determining whether a first system identifier matches a second proof-of-purchase to within a second tolerance may comprise determining whether a distance between the two system identifiers is less than the second tolerance. The second tolerance may be a number indicating the maximal allowed distance between the first and second system identifiers, wherein the distance between two system identifiers may be measured in any number of ways. For instance, if both system identifiers are binary strings, the distance could be the number of locations at which the bits are different.

In some embodiments, the comparison of the OEM-reported system identifier to the user-provided system identifier, in act 604, may be done to within a tolerance in order to account for possible modification in the hardware configuration of the system from the time the OEM-generated system identifier was reported to the software vendor (e.g., act 807 in FIG. 3) to the time that the software activation request was sent from the user computer to the software vendor. Examples of system modifications include installing and/or removing a hard-drive, a Peripheral Component Interconnect (PCI) card, and/or RAM. Examples of PCI cards further comprise video cards, network cards, modems, sound cards, additional external ports, TV tuners, and disk controllers. In some embodiments, matching the OEM-reported system identifier and the user computer's system identifier to within some tolerance may allow the process 600 to associate the user's system to the system built and shipped by the OEM to the user despite a number of modifications to the system hardware.

If the system identifier in the activation request does not match the OEM-reported system identifier to within a second tolerance, a notification of activation denial and/or installation failure may be sent to the requesting computer, in act 509. On the other hand, if the system identifier in the activation request matches the OEM-reported system identifier to within a second tolerance, a notification of activation may be sent to the user, and software features may be enabled on the user's computer. The process 600 then completes. However, not all embodiments of the invention are limited to such an implementation. For example, in some embodiments a notification of activation may be sent to the user even if the system identifier does not match the OEM-reported system identifier to within an acceptable tolerance. This may be done due to business considerations or any other suitable criteria. Other embodiments may involve performing additional and/or alternative acts in order to respond to the activation request.

Figure 7:
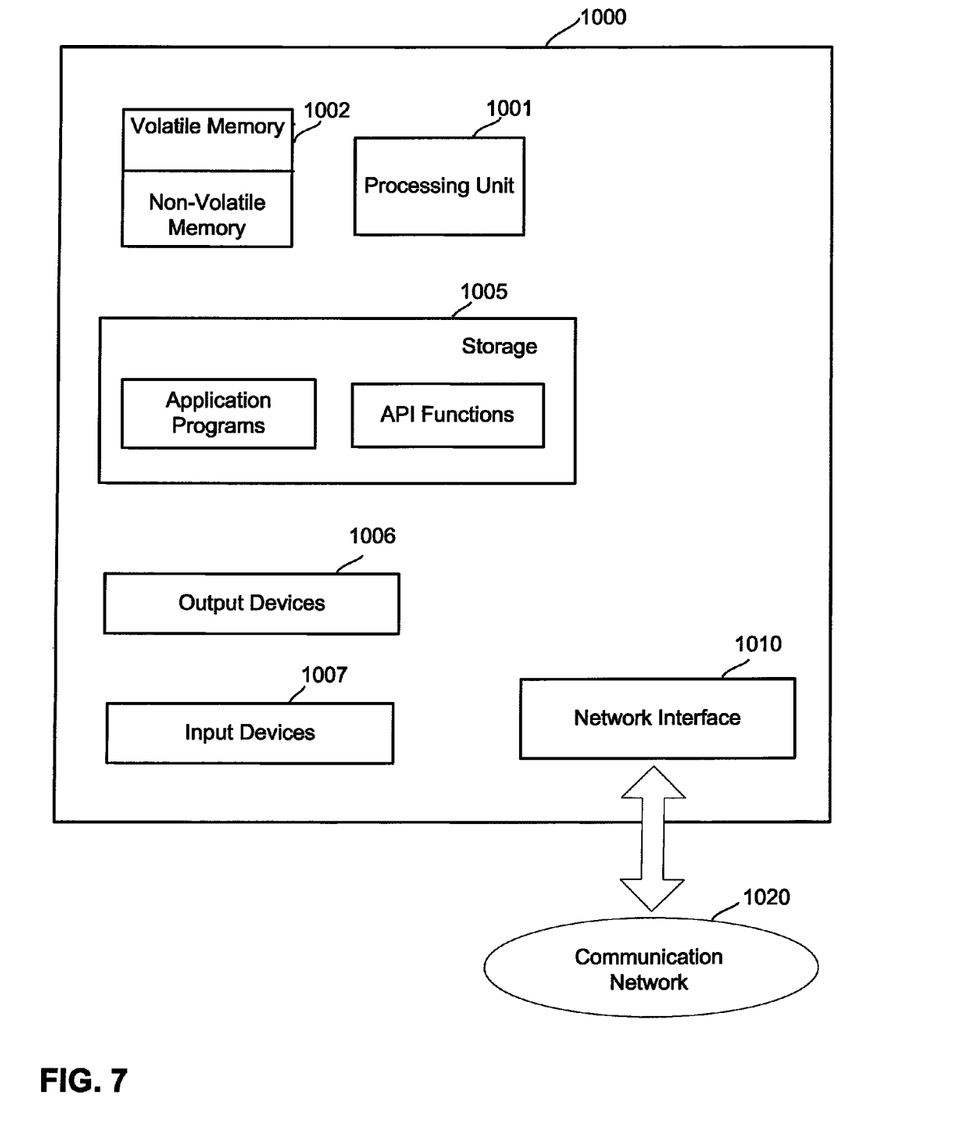
FIG. 7 shows, schematically, an illustrative computer on which various embodiments of the present disclosure may be implemented.

FIG. 7 shows, schematically, an illustrative computer 1000 on which various inventive aspects of the present disclosure may be implemented. For instance, any of the functionalities described herein for the system 204 received by the end user, the proof-of-purchase generation server 301, the proof-of-purchase delivery server 302, the third party proof-of-purchase distribution server 303, the OEM proof-of-purchase server, 304, the DAIS assembly server 305, the manufactured computer 306, the OEM reporting server 307, the software vendor's reporting server 308, the activation and validation server 309, and the user's computer 204 of FIG. 3 may be implemented on such a computer.

The computer 1000 includes a processor or processing unit 1001 and a memory 1002 that may include volatile and/or non-volatile memory. The computer 1000 may also include storage 1005 (e.g., one or more disk drives) in addition to the system memory 1002. The memory 1002 may store one or more instructions to program the processing unit 1001 to perform any of the functions described herein. The memory 1002 may also store one more application programs and/or Application Programming Interface (API) functions.

The computer 1000 may have one or more input devices and/or output devices, such as devices 1006 and 1007 illustrated in FIG. 7. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 7, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks, or fiber optic networks.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

It should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A software activation server computing device for enabling activation of software, comprising:
   a memory and a processor that are respectively configured to store and execute instructions that:
   receive an indication of an assignment of a specific digital proof-of-purchase to a specific system identifier of a hardware platform of a client computing device, the
indication including a first instance of a digital autho-
rization information set (DAIS) that represents the
assignment of the specific digital proof-of-purchase
to the specific system identifier to which the specific
digital proof-of-purchase of the first instance is
assigned;

receive an activation request from the client computing
device, wherein the activation request includes a sec-
ond instance of a DAIS, wherein the second instance
includes a client provided digital proof-of-purchase
transmitted from the client computing device and a
client provided system identifier transmitted from the
client computing device;

compare the first instance of the DAIS with the second
instance of the DAIS; and transmit, to the client computing device, a response to
the activation request based on a result of the com-
parison.

2. The software activation server computing device of claim 1, wherein the specific digital proof-of-purchase of the first instance comprises identification information for one copy of the software.

3. The software activation server computing device of claim 1, wherein the client provided system identifier of the second instance is based on a hardware configuration of the hardware platform at the time the activation request is trans-mitted from the client computing device.

4. The software activation server computing device of claim 1, wherein the comparison of the first instance to the second instance comprises:

checking whether the specific digital proof-of-purchase of the first instance matches the client provided digital proof-of-purchase of the second instance to within a first tolerance; and checking whether the specific system identifier of the first instance matches the client provided system identifier of the second instance to within a second tolerance.

5. The software activation server computing device of claim 4, wherein the checking whether the specific system identifier of the first instance matches the client provided system identifier of the second instance to within a second tolerance comprises:

determining whether a distance between the specific sys-tem identifier and client provided system identifier is less than the second tolerance.

6. The software activation server computing device of claim 1, wherein transmission of the response comprises:

transmitting an authorization to activate features of the software and/or transmitting a notification of an activa-tion failure.

7. The software activation server computing device of claim 1, wherein:

the memory and the processor are further configured to store and execute instructions that:

generate and deliver digital proofs-of-purchase to a manufacturer of the hardware platform, and wherein the specific digital proof-of-purchase of the first instance is one of the digital proofs-of-purchase delivered to the manufacturer.

8. The software activation server computing device of claim 1, wherein:

the memory and the processor are further configured to store and execute instructions that:

generate and deliver digital proofs-of-purchase to a third party proof-of-purchase distributor, and wherein the specific digital proof-of-purchase of the first instance is one of the digital proofs-of-purchase delivered to the third party proof-of-purchase distributor.

9. The software activation server computing device of claim 1, wherein the memory and the processor are further configured to store and execute instructions that:

gather correlation data, wherein the correlation data com-prises the number of hardware platforms pre-installed with the software, hardware configurations of the hard-ware platforms, and/or locations of the hardware plat-forms.

10. The software activation server computing device of claim 9, wherein the memory and processor are further con-figured to store and execute instructions that:

report the correlation data to at least one manufacturer of the hardware platforms.

11. A method of enabling activation of software, the method comprising:

receiving, by an activation server computing device, an indication of an assignment of a specific digital proof-of-purchase to a specific system identifier of a hardware platform of a client computing device, the indication including a first instance of a digital authorization infor-mation set (DAIS) that represents the assignment of the specific digital proof-of-purchase to the specific system identifier to which the specific digital proof-of-purchase of the first instance is assigned;

receiving, by the activation server computing device, an activation request from the client computing device, wherein the activation request includes a second instance of a DAIS, wherein the second instance includes a client provided digital proof-of-purchase transmitted from the client computing device and a cli-ent provided system identifier transmitted from the cli-ent computing device;

comparing, by the activation server computing device, the first instance of the DAIS with the second instance of the DAIS; and transmitting, to the client computing device, a response to the activation request that is based on the comparison.

12. The method of claim 11, wherein the specific system identifier is provided by a manufacturer of the hardware plat-form and the client provided system identifier is based on a hardware configuration of the hardware platform at the time the activation request is transmitted from the client comput-ing device.

13. The method of claim 11, wherein the comparing com-prises:

determining whether the specific digital proof-of-purchase of the first instance matches the client provided digital proof-of-purchase of the second instance to within a first tolerance; and determining whether the specific system identifier of the first instance matches the client provided system identi-fier of the second instance to within a second tolerance.

14. The method of claim 11, wherein the method further comprises:

generating and delivering digital proofs-of-purchase to a manufacturer of the hardware platform or to a third party proof-of-purchase distributor, and wherein the specific digital proof-of-purchase of the first instance is one of the digital proofs-of-purchase delivered to the manufacturer or the third party proof-of-purchase dis-tributor.

15. The method of claim 11, wherein the method further comprises:

gathering correlation data, wherein the correlation data comprises a number of hardware platforms pre-installed with the software, hardware configurations of the hardware platforms, and/or locations of the hardware platforms.

16. A computer-readable storage medium, not comprising a signal per se, having instructions stored thereon for performing operations for enabling activation of software, the operations comprising:

receiving, by an activation server computing device, an indication of an assignment of a specific digital proof-of-purchase to a specific system identifier of a hardware platform of a client computing device, the indication including a first instance of a digital authorization information set (DAIS) that represents the assignment of the specific digital proof-of-purchase to the specific system identifier to which the specific digital proof-of-purchase of the first instance is assigned;

receiving, by the activation server computing device, an activation request from the client computing device, wherein the activation request includes a second instance of a DAIS, wherein the second instance includes a client provided digital proof-of-purchase transmitted from the client computing device and a client provided system identifier transmitted from the client computing device;

comparing, by the activation server computing device, the first instance of the DAIS with the second instance of the DAIS; and transmitting, to the client computing device, a response to the activation request that is based on the comparison.

17. The computer-readable storage medium of claim 16, wherein the specific system identifier is provided by a manufacturer of the hardware platform and the client provided system identifier is based on a hardware configuration of the hardware platform at the time the activation request is transmitted from the client computing device.

18. The computer-readable storage medium of claim 16, wherein the operations further comprise:

generating and delivering digital proofs-of-purchase to a manufacturer of the hardware platform or to a third party proof-of-purchase distributor, and wherein the specific digital proof-of-purchase is one of the digital proofs-of-purchase delivered to the manufacturer or the third party proof-of-purchase distributor.

19. The computer-readable storage medium of claim 16, wherein the client provided digital proof-of-purchase was stored in at least a system BIOS, a secure location on a file system, a storage location accessible via an implementation of UEFI, or in a trusted platform module.

20. The computer-readable storage medium of claim 16, wherein the first instance of the DAIS also includes an OEM identifier and additional information, and wherein additional information further comprises a time stamp, hardware profile, alphanumeric SKU identifier, OEM model number, and/or service tag.

* * * * *